May 27, 1947. D. E. WADSWORTH 2,421,104
SWIVEL JOINT FOR SPRINKLERS
Filed June 16, 1944 2 Sheets-Sheet 1
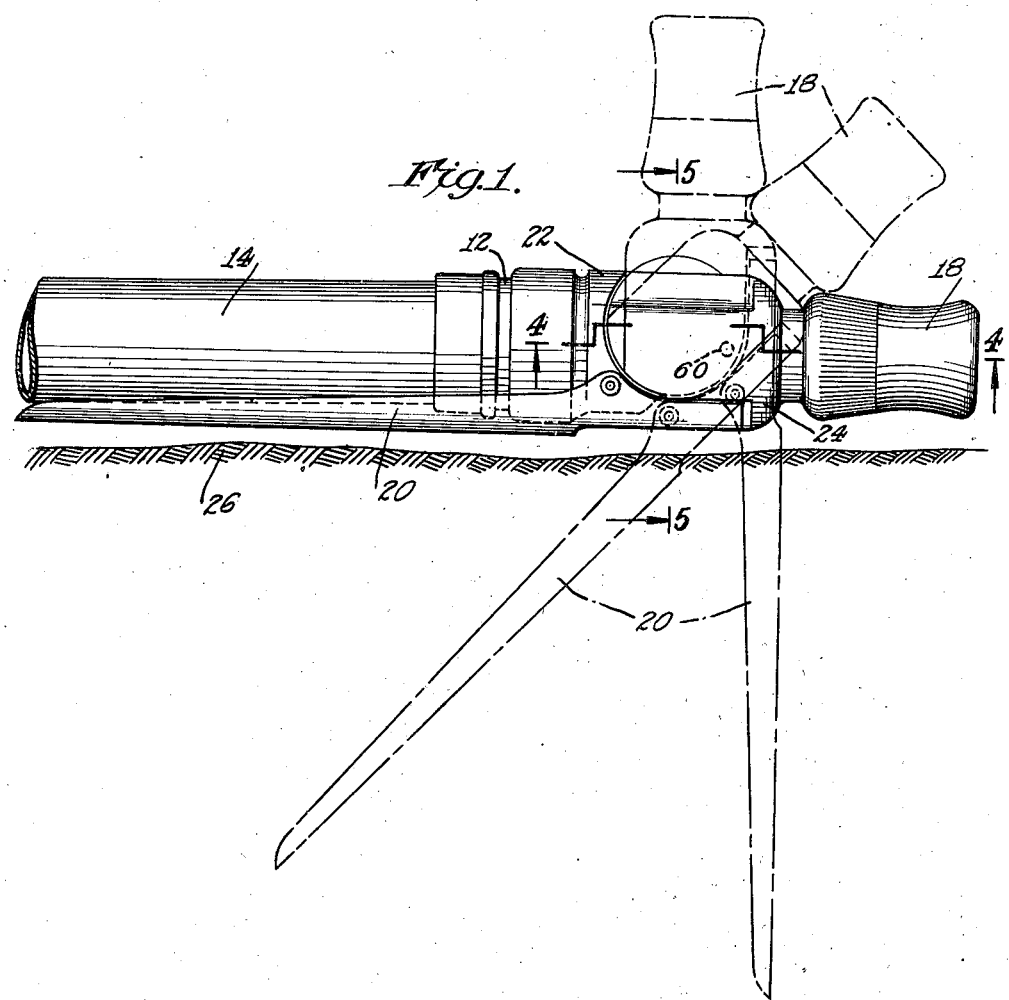
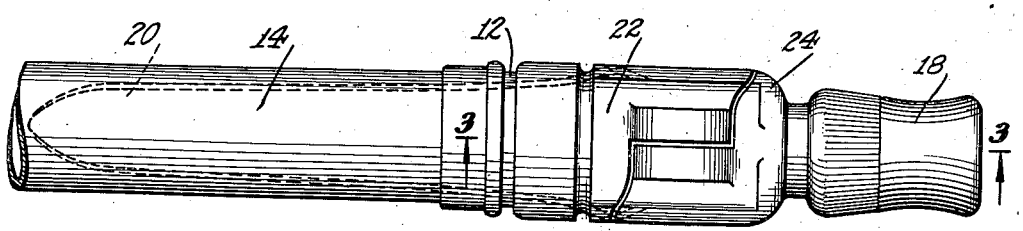
INVENTOR.
DONALD E. WADSWORTH
BY
Frederick Griswold, Jr.
ATTORNEY May 27, 1947.     D. E. WADSWORTH     2,421,104
SWIVEL JOINT FOR SPRINKLERS
Filed June 16, 1944     2 Sheets-Sheet 2
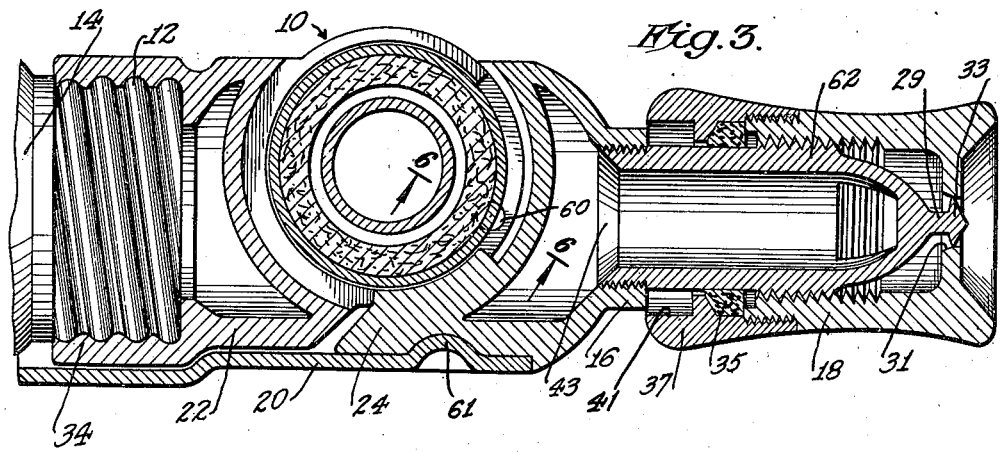
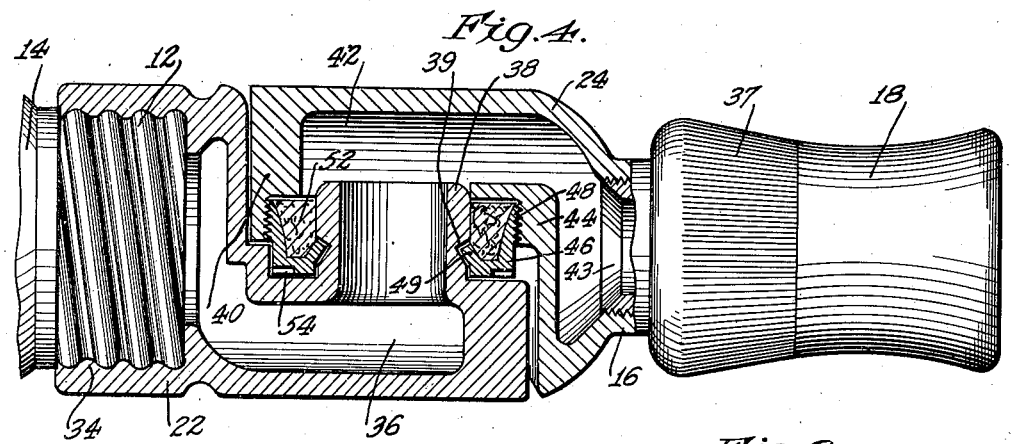
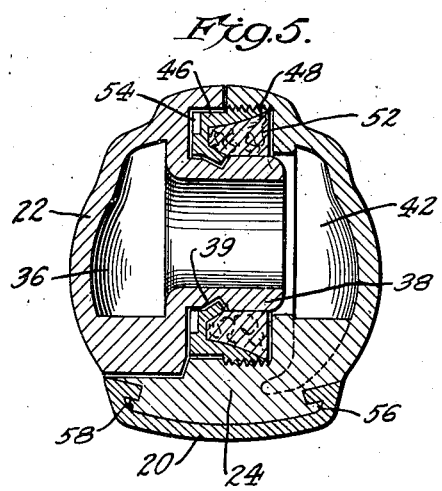
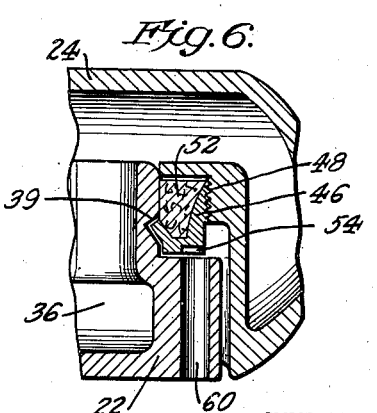
INVENTOR.
DONALD E. WADSWORTH
BY
Frederick Griswold, Jr.
ATTORNEY Patented May 27, 1947

2,421,104

UNITED STATES PATENT OFFICE 2,421,104

SWIVEL JOINT FOR SPRINKLERS

Donald E. Wadsworth, Miami, Fla.

Application June 16, 1944, Serial No. 540,626

3 Claims. (Cl. 285—97.5)

This invention relates to improvements in sprinkler units particularly for attachment to the end of a garden hose of the kind that may be held in the hand to direct a stream of water in the direction desired or may be positioned on the ground for distributing the water as a spray or stream over the surrounding area.

It has heretofore been proposed to provide a fitting for attachment to a garden hose having one orifice for use when held in the hand and a second orifice for use when placed in fixed position upon the lawn, both said orifices being controllable so that one is inoperative when the other is rendered operative.

It has also been proposed to mount a nozzle for this purpose on a stake or spike which is driven into the ground to maintain the nozzle in fixed position. Stakes for this purpose have also been proposed which are curved in cross-section to fit around the hose when the nozzle is intended to be held in the hand. Where such stakes or spikes have been proposed, they have failed of public acceptance mainly because they have been attachable to a hose having the conventional nozzle, and nothing more, and where a spray is required the axis of which is vertical, difficulty has been experienced in attempting to bend the end of the hose through the required arc of short radius to accomplish the purpose. In practice, such a spike or stake has served merely to replace the human hand but has produced only a spray at an acute angle to the ground. Attempts have therefore been made to solve the difficulty by combining in an integral fixture a nozzle to be held in the hand and a second or spray fixture surmounting the nozzle. When these features are provided with a stake or spike, a particularly bulky and clumsy unit is produced which is inconvenient to hold in the hand, is only partly effective as a spray and has not met with public acceptance.

The present invention seeks a compact sprinkler unit for attachment to the end of a hose which avoids the foregoing defects; can be utilized as a spray or to produce a stream when placed on the ground; can be held in position on the ground by means of a spike or stake pushed into the ground; and which may be conveniently held in the hand for portable hand-sprinkling without inconvenience because of the absence of undue weight, awkwardness or bulk.

It is also an object of this invention to provide a nozzle structure particularly adapted for use on a jointed fitting of the character described.

Another object of the invention is a spike or stake so carried by the attachment that it will lie along the hose and fit conveniently within the hand holding the sprinkler unit but which, upon being pushed into the ground, will hold the sprinkler unit in the desired position when used for stationary ground sprinkling.

Yet another object of the invention is a sprinkler unit of the character described which may be set to the desired spray or stream and the stake then pushed into the ground at the desired place, before the operator leaves to go to the valve at a remote place to turn on the water.

A further object of the invention is a sprinkler unit capable of a wide range of nozzle adjustment, including water shut-off.

The invention also seeks a sprinkler unit which is practical from the standpoint of ease and practicability in manufacture and convenience in use.

These and other objects of the invention and the means for their attainment will be more apparent from the following detailed description taken in connection with the accompanying drawings illustrating one embodiment by which the invention may be realized and in which:

Fig. 1 is a view of the sprinkler unit and associated parts shown in full line in the position to be held in the hand and with various positions of adjustment shown in broken lines;

Fig. 2 is a view showing the sprinkler unit of Fig. 1 looking from above;

Fig. 3 is a longitudinal vertical sectional view showing the attachment of this invention and taken on the line 3—3 of Fig. 2, looking in the direction of the arrows, the sprinkler head being sectioned to show the spray stream shut-off instrumentality;

Fig. 4 is a longitudinal sectional view taken in the plane indicated by the line 4—4 of Fig. 1 looking in the direction of the arrows;

Fig. 5 is a fragmentary transverse sectional view taken in the plane indicated by the line 5—5 of Fig. 1 looking in the direction of the arrows and showing the relation of parts when the nozzle end and the hose end of the fitting are in prolongation; and Fig. 6 is a fragmentary sectional view taken in the plane indicated by the line 6—6 of Fig. 3 looking in the direction of the arrows and showing means to rotate the bearing ring and to compact the packing between the fitting members to avoid leakage at the joint.

In the drawings, Fig. 3, the adjustable attachment 10 is shown as threaded on the threaded nipple 12 of a hose 14. On the opposite end of the attachment is a nipple 16 which is inwardly threaded to receive the threaded inner end of a flow-controlling nozzle element 18. A spike or stake 20 is mounted on the movable part 24 of attachment 10 and is curved transversely, as shown in Fig. 5, to lie closely around the hose 14 in the Fig. 1 position of the parts.

The attachment 10 is jointed so that the two relatively movable parts 22 and 24 thereof may be positioned at any desired angle, say, at right angles to one another as shown in Fig. 1 whereby the nozzle end 24 and the stake 20 are, say, vertical while the hose 14 may extend generally parallel to the ground, represented at 26, without bending the hose. The attachment may be positioned in any desired position before water is turned on, the type of spray or stream desired being adjusted by rotating the nozzle 18 to produce the spray or stream sought and which is controlled by the relative position of the needle 29 (Fig. 3) with respect to the orifice 31. While the nozzle structure 18, 29 is shown as removable from the adjustable attachment portion 24, it will be obvious that the nozzle may be integral with the adjustable part 24.

Referring now to Figs. 3 through 6 for an understanding of one form which the construction of the fitting may take and by which adjustment of the device to project the spray or stream at any angle to the axis of the hose and nipple 12 may be achieved, the fitting comprises two relatively movable sections 22 and 24 of which the section 22 is illustrated as adapted to be screwed on to nipple 12 on the end of the hose 14 by means of the threads 34. The movable section 22 is reduced to a passage portion 36 of ample capacity for the purpose at hand from which extends, at right angles thereto, a cylindrical conduit 38 which also serves as a bearing for the adjustable fitting portion 24.

The wall of conduit member 38 is formed with a peripheral V-shaped groove 39. The member 24 is formed with a conduit portion 40 communicating with the outlet orifice 43 in the threaded coupling member 16 and is also formed with a semi-cylindrical passage 42 formed with the annular portion 44, the threads 48 of which are adapted to engage the threads of a coacting bearing ring 46 having an annular inner extension 49 generally U-shaped in cross-section. The inner side wall of the ring 46 is capable of deflection to extend inwardly, as shown, at any angle to engage in an annular recess in the conduit member 38.

In assembly, the bearing ring 46 is placed in position on the conduit member 38 and is then fixed against displacement by the use of a special tool which deflects the wall into the V-shaped groove 39. Packing 52 is then fitted into the space between the cylindrical bearing conduit member 38 and the bearing ring 46.

To removably secure the fitting portion 22 in sealed connection with the part 24, with provision for angular movement, the bearing and locking ring 46 is made capable of manual rotation, as by a series of recesses, pockets or teeth on its outer periphery, as shown at 54 in Figs. 4, 5 and 6, and so that rotation of the knurled bearing ring 46 may be effected to compress the packing. To effect rotation of the bearing and locking ring 46 into locking engagement between the parts, the member 22 is formed with an aperture or passage 60, Figs. 3 and 6, in register with the pockets in the ring 46. Then by passing a pin through the passage 60 and into a pocket, the ring 46 is held fast and rotation of the part 24 will thread that part on to the threads of member 46 to lock the parts together.

The spike or stake 20 is mounted on the adjustable fitting portion 24, as will be understood. While the stake may be secured in any convenient manner, it is preferably mounted so that it cannot be removed. The stake is preferably curvilinear in cross-section as shown in Fig. 1 to closely surround the hose when the nozzle is in prolongation thereof and so that the nozzle and stake may be conveniently grasped in the hand. As shown, for purposes of illustration only, the connection between the stake 20 and fitting 24 comprises lugs 56 on the fitting, Fig. 5, and coacting grooves 58 on the stake 20 whereby the stake may be mounted on the fitting portion 24. Longitudinal displacement of the stake from the fitting may be prevented by indenting a portion 61 of the stake into a recess in the fitting. This construction permanently prevents relative displacement of the stake in the longitudinal direction thereof so that the stake is not removable.

While the nozzle may take any desired form, a composite structure is shown in Fig. 3. A bullet-shaped inner member 62 is open at its inner end and is externally threaded at that end to be removably received in the nipple 16. The inner end of the member 62 is open to receive fluid from the movable part 24. Its opposite end is slotted to permit escape of the liquid and a button 33 on the needle 29 serves as a flow-controlling element in conjunction with the orifice 31 in the nozzle section 18 which is adjustably mounted on the threads of the member 62. The joint is sealed by packing 35 retained between the element 18 and a packing ring 37 threaded on the member 18. The packing ring is conveniently recessed as at 41 so that the nozzle member 18, 37 may be reciprocated over the nipple 16.

It will thus be seen that a sprinkler fitting has been provided for the end of the hose which may be disposed at any desired angle with respect to the axis of the hose and which, together with a stake to be inserted in the ground, affords a sprinkler directing either a stream or a spray at a selected angle with respect to the horizontal.

Various modifications will occur to those skilled in the art in the composition, configuration and disposition of the various component elements going to make up the invention as a whole and no limitation is intended by the phraseology of the foregoing description or illustrations in the accompanying drawings except as indicated in the appended claims.

What is claimed is:

1. A universal sprinkler unit comprising a fitting member for attachment to a hose, a fitting member to receive a spray nozzle, telescoping cylindrical means rotatably mounting the fitting members together comprising a removable annular bearing ring U-shaped in cross-section on one member and whereof one wall is received in a recess in the other cylindrical means.

2. A universal sprinkler unit comprising a fitting member for attachment to a hose comprising a semi-cylindrical coupling member formed with an annular hollow bearing in communicating connection with the fitting member, an annular coacting fitting member for attachment to a spray nozzle comprising an annular threaded part, a bearing ring formed with a coacting threaded part and a deformable wall, an annular recess in the cylindrical conduit portion to receive the deformable wall, packing in the bearing ring, said bearing ring being formed with a ratchet and one of said coupling members being formed with an aperture to receive a pin engaging the ratchet.

3. A universal sprinkler unit comprising a fitting member for attachment to a hose comprising a semi-cylindrical coupling member formed with a transversely extending annular hollow bearing in communicating connection with the fitting member, said hollow bearing being formed with a groove, an annular coacting fitting member for attachment to a spray nozzle comprising an annular threaded part, and a bearing ring U shaped in cross-section formed with a coacting threaded part and a deformable wall adapted to be displaced into the groove.

DONALD E. WADSWORTH.

REFERENCES CITED

The following references are of record in the file of this patent:

UNITED STATES PATENTS

| Number | Name | Date |
|---|---|---|
| 244,446 | Gilmore | July 19, 1881 |
| 1,946,696 | Johnson | Feb. 13, 1934 |
| 1,564,270 | Phillips | Dec. 8, 1925 |
| Re. 3,704 | Morrison | Nov. 2, 1869 |